United States Patent

[11] 3,587,790

| [72] | Inventor | Harold E. Schultze |
| | | Dayton, Ohio |
| [21] | Appl. No. | 825,336 |
| [22] | Filed | May 16, 1969 |
| [45] | Patented | June 28, 1971 |
| [73] | Assignee | General Motors Corporation |
| | | Detroit, Mich. |

[54] CYLINDER END ASSEMBLY FOR SHOCK ABSORBER
1 Claim, 4 Drawing Figs.

[52] U.S. Cl. .................................................. 188/100,
137/493.8, 137/512.3
[51] Int. Cl. ................................................. F16f 9/34
[50] Field of Search .......................................... 188/100;
137/512.3, 493.8

[56] References Cited
UNITED STATES PATENTS
2,518,553  8/1950  Kieber ........................ 188/100UX
2,697,496  12/1954  McIntyre ...................... 137/493.8X
3,098,546  7/1963  Karlgaard ..................... 188/100X FOREIGN PATENTS
1,059,375  11/1953  France ........................ 137/493.8

*Primary Examiner*—George E. A. Halvosa
*Attorneys*—Warren E. Finken and John C. Evans ABSTRACT: In preferred form, a hydraulic direct acting shock absorber having a base valve on one end of a pressure cylinder tube to regulate the flow of hydraulic fluid between a reservoir chamber and a compression chamber. Dual inlet ports and an overlying inlet reed valve and inlet leaf spring cooperate to regulate fluid flow from reservoir chamber to the compression chamber. A pair of compression valves supported in the base valve regulate fluid flow from the compression chamber to the reservoir chamber. Additionally, a peripheral flange on the compression valves are adapted to bias the inlet leaf spring against the inlet reed valve.

PATENTED JUN 28 1971
3,587,790
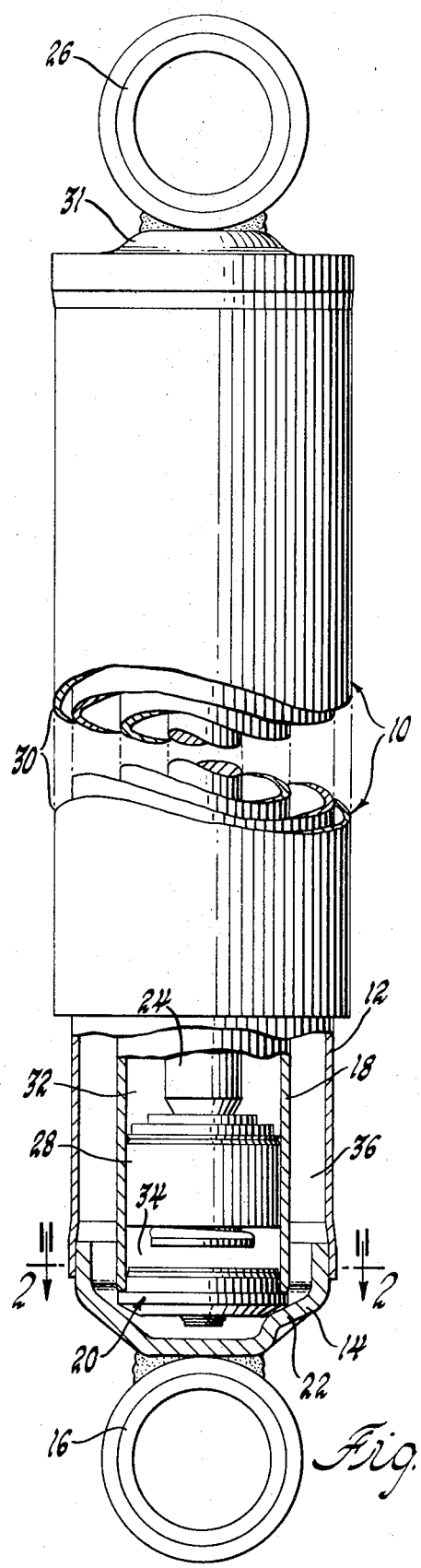
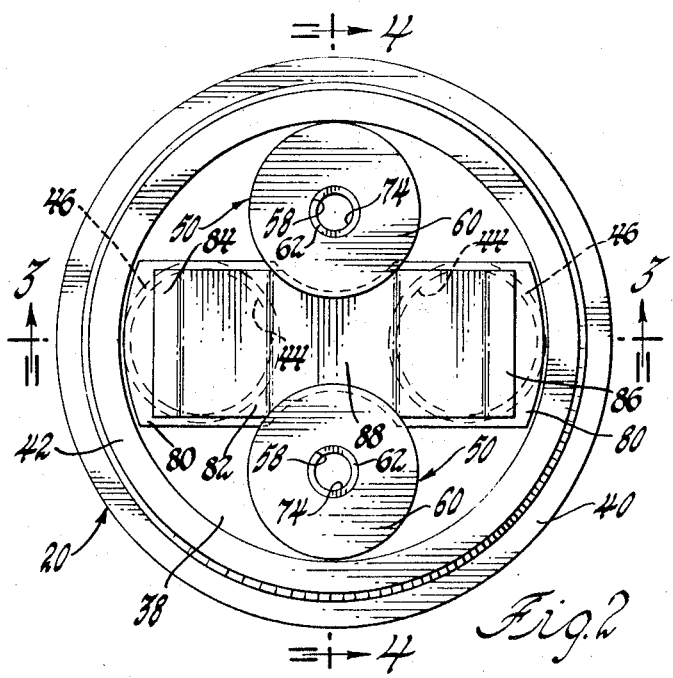
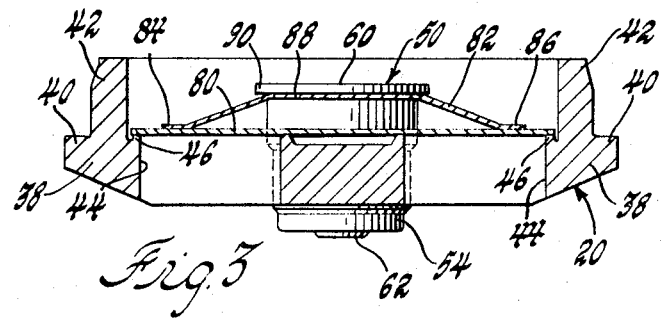
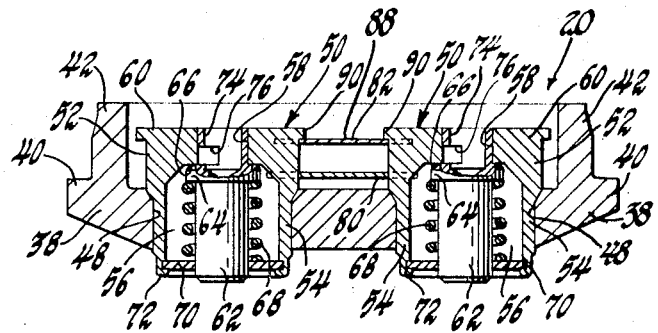
INVENTOR.
Harold C. Schultze
BY
J. C. Evans
ATTORNEY

CYLINDER END ASSEMBLY FOR SHOCK ABSORBER

This invention relates to direct acting hydraulic shock absorbers and more particularly to a base valve for direct acting hydraulic shock absorbers.

It has long been recognized by manufacturers that the standardization of a basic part for use in a variety of product models is an effective cost reducing method. Also, such standardization permits the manufacturer to concentrate on perfecting a fewer number of basic parts and results in reduced inventory requirements.

Because of the wide range of diverse applications to which hydraulic direct acting shock absorbers are applied, a number of shock absorber models with varying load capacities are usually produced. The fluid flow capacity of one particular shock absorber element, the base valve, is dependent on the size and load capacity of the shock absorber. More particularly when the piston and piston rod of a shock absorber move downward within the shock absorber during a compression stroke, the increasing volumetric displacement of the piston rod causes a portion of a hydraulic fluid to flow through compression valves of the base valve into a reservoir chamber. As a consequence, a large shock absorber having a relatively large piston rod requires a base valve which has greater fluid flow capacity during the compression stroke than a smaller shock absorber would require.

The base valve assembly of the present invention utilizes two compression valve assemblies which extend through a base portion. Standard size compression valve assemblies normally employed singularly in the base valve assemblies of smaller shock absorbers are used in pairs in the base valve assemblies of larger shock absorbers to double the fluid flow capacity of the base valve assembly during the compression stroke. Consequently, a desirable feature of the subject shock absorber is that the same basic compression valve may be used in both large and small shock absorbers by varying the diameter of the base valve and the number of compression valves.

Another desirable feature of the subject shock absorber relates to its novel construction and manner of assembly. The pair of compression valves are press fitted in bores in the base valve and contact the inlet valve spring to bias the inlet valve against inlet ports and to secure the assembly together. More particularly, a substantially flat reed valve is laid over the inlet ports to regulate fluid flow therethrough. A leaf spring whose ends are adapted to rest against the inlet reed valve is placed over the reed valve and is held at its midsection a predetermined distance from base valve by peripheral edges on the compression valves.

Therefore, an object of the inventor is to employ two standard sized compression valves in the base valves of large shock absorbers requiring increased fluid flow capacity which compression valves are designed for individual use in base valves of smaller model shock absorbers that have decreased fluid flow requirements.

A further object of the inventor is to provide a simplified and compact base valve assembly for shock absorbers in which two compression valves are pressed respectively into twin bores through the base valve and peripheral edges on the compression valves and retain an inlet valve spring and an inlet reed valve against inlet ports through the base valve.

Further objects and advantages of the present invention will be apparent from the following description, reference being had to the accompanying drawings wherein a preferred embodiment of the present invention is clearly shown.

In the drawings:

FIG. 1 is a vertical view of a shock absorber partly in section to reveal the base valve of the present invention;

FIG. 2 is a sectional view of the base valve taken along section line 2-2 of FIG. 1 looking in the direction of the arrows;

FIG. 3 is a sectional view taken along section line 3-3 of FIG. 2 looking in the direction of the arrows;

FIG. 4 is a sectional view taken along section line 4-4 of FIG. 2 looking in the direction of the arrows.

In FIG. 1 of the drawings, a direct acting hydraulic shock absorber assembly 10 is shown including an outer reservoir tube 12 which is attached at its lower end in a fluid-type manner to a circular cup-shaped bottom end cap 14. A fitting 16 affixed to the exterior surface of the bottom end cap 14 is adapted to secure the shock absorber assembly 10 to the unsprung mass of the vehicle.

A pressure cylinder tube 18 is concentrically located within reservoir tube 12. A base valve 20 is held within the bottom end of the pressure cylinder tube 18 by a plurality of indentations 22 (only one of which is shown) in the end cap 14. Concentrically supported within the pressure cylinder tube 18 and reciprocal therein is a piston rod 24. A fitting 26 is affixed to the top end of piston rod 24 exteriorly of the shock absorber 10. Fitting 26 is adapted to secure the shock absorber to a sprung mass of the vehicle. A valved piston 28 is coaxially supported within pressure cylinder tube 18 and is attached to the lower end of piston rod 24 for reciprocal movement therewith. Relative movement between the sprung mass and the unsprung mass of the vehicle causes the piston rod 24 and piston 28 to reciprocate within the pressure cylinder tube 18. A cylindrical dust shield 30 and an end cover 31 are attached together and to an upper end of the piston rod 24. Dust shield 30 extends concentrically around reservoir tube 12 to keep dirt and flying objects from contacting the piston rod 24.

A variable volume rebound chamber 32 is formed within the upper end of pressure cylinder tube 18. A variable volume compression chamber 34 is formed within pressure cylinder tube 18 between the base valve 20 and the movable valved piston 28. Both chambers 32 and chamber 34 are completely filled with hydraulic fluid during normal operation of the shock absorber. Upward movement of the valved piston 28 within pressure cylinder tube 18 necessarily decreases the volume of the rebound chamber 32. Likewise, downward movement of the valved piston 28 within pressure cylinder tube 18 decreases the volume of the compression chamber 34. Valving elements (not shown) in the piston 28 regulate the flow of hydraulic fluid between chambers 32 and 34 caused by reciprocation of the piston 28 within the pressure cylinder tube 18. This regulation of hydraulic fluid flow through the valved piston 28 produces a predetermined dampening of relative movement between sprung and unsprung masses of the associated vehicle.

Movement of piston 28 downward within pressure cylinder tube 18 decreases the volume of compression chamber 34 more than it increases the volume of rebound chamber 32. Likewise, on upward piston movement the increase in compression chamber volume is more than the decrease in rebound chamber volume. This differential volume equals the variable space occupied by the piston rod 24 in either entering or exiting the rebound chamber 32. Because of this volumetric inequality, a supplementary quantity of hydraulic fluid must be supplied to the compression chamber 34 upon movement of the piston 28 upward in pressure cylinder tube 18 and must be drawn from compression chamber 34 upon movement of piston 28 downward in pressure cylinder tube 18. A reservoir chamber 36 is located in the annular space between the reservoir tube 12 and the pressure cylinder tube 18 to store this supplementary fluid supply.

The base valve 20 is positioned between reservoir chamber 36 and compression chamber 34 and regulates the flow of supplemental hydraulic fluid therebetween. In FIGS. 2, 3 and 4 one embodiment of a base valve according to the present invention is illustrated. The base valve 20 includes a base 38 having an edge 40. An upwardly extending flange 42 on the base 38 is adapted to fit within the lower end of pressure cylinder tube 18. After assembly of the shock absorber the base 38 is axially held against the end of pressure cylinder tube 18 at edge 40 by a plurality of indentations 22.

Two diametrically opposed inlet ports 44 extend through base 38 to form a fluid path from reservoir chamber 36 to compression chamber 34. An upstanding annular valve seat 46 is formed around the upper edge of inlet port 44. Also, two diametrically opposed compression valve bores 48 extend through base 38 of the base valve 20. Inlet ports 44 and bores 48 are symmetrically arranged about the center of base 38.

In FIGS. 2 and 4 compression valves 50 are shown press fitted into bores 48 to regulate fluid flow from compression chamber 34 to reservoir chamber 36. Compression valve 50 includes a cup-shaped valve cage 52 having a depending thin wall 54 which defines a compression valve chamber 56. An axially directed port 58 extends through an end 60 of the valve cage 52. A valve pin 62 is supported for reciprocation within port 58 and extends into valve chamber 56. An enlarged diameter portion 64 on valve pin 62 is normally biased against a bottom surface 66 of the valve cage 52 by a coil spring 68. Spring 68 is supported in chamber 56 by a retainer 70. Retainer 70 is held within valve chamber 56 on the end of wall 54 by a spun over portion 72 of the thin wall 54. The upper end of valve pin 62 has an axial bore 74 and a valve cutout 76 to provide a fluid passage from compression chamber 34 through bore 74, through cutout 76 into reservoir chamber 36. When the fluid pressure in the compression chamber 34 forces valve pin 62 downward against the coil spring 68, cutout 76 moves into valve chamber 56 to open the aforesaid fluid passage between chambers 34 and 36.

A flat reed valve 80 overlies inlet port 44 and extends between the two compression valve assemblies 50 shown in FIG. 4. The underside of reed valve 80 rests on valve seat 46 to block the flow of hydraulic fluid from compression chamber 34 to reservoir chamber 36. A leaf spring 82 bears at opposite ends 84 and 86 against the upper surface of reed valve 80 to bias the reed valve 80 against seat 46. A midportion 88 of leaf spring 82 is held a predetermined distance from the upper surface of base 38 by peripheral flanges or edges 90 on the upper ends 60 of the compression valve assemblies 50. Reed valve 80 and leaf spring 82 coact with valve seat 46 to regulate the flow of hydraulic fluid from the reservoir chamber 36 to the compression chamber 34.

In a relatively large shock absorber having a 1¾-inch diameter pressure cylinder tube, its ⅞-inch diameter piston rod has a cross-sectional area of 0.6 square inches. In a smaller shock absorber having a 1⅜-inch pressure cylinder tube its ⅝-inch diameter piston rod has a cross-sectional area of only 0.3 square inches. The piston rod displacement during a 4-inch stroke is approximately 2.4 square inches in the 1¾-inch shock absorber and approximately 1.2 square inches in the 1⅜-inch shock absorber.

As previously stated the compression valve regulates the flow of supplemental hydraulic fluid from the compression chamber to the reservoir chamber during the compression stroke. This supplemental flow is caused by the increased displacement of the piston rod entering the rebound chamber. As is demonstrated by the aforementioned FIGS. the fluid flow through the base valve of the 1¾-inch shock absorber normally is twice as great as the fluid flow through the base valve of the 1⅜-inch shock absorber. By utilizing two compression valves in the base valve for the 1¾-inch shock absorber, its flow requirements are satisfied and the same compression valve may be used alone in the 1⅜-inch shock absorber.

The substitution of two smaller compression valves for a single large compression valve in a base valve for large capacity shock absorbers is desirable. The greater size of prior compression valves for large shock absorbers was necessitated by increased fluid flow requirements during the compression stroke. Particularly the thickness of the base valve assembly is desirably reduced by using a plurality of relatively thin compression valves in place of a single relatively thick compression valve. This allows for a longer stroke of the piston. Another feature which decreases thickness is the coplanar relationship between the inlet reed valve and the compression valve.

While the embodiment of the present invention as herein described constitutes a preferred form, it is to be understood that other forms may be adapted. Particularly, the use of three or more compression valve assemblies is contemplated in place of a single compression valve.

I claim:

1. A hydraulic direct acting shock absorber comprising: a cylindrical pressure cylinder tube; valved piston means concentrically supported within said pressure cylinder tube; a cylindrical reservoir tube concentrically around said pressure cylinder tube and forming a hydraulic fluid reservoir chamber therebetween; a piston rod concentrically within said pressure cylinder tube and attached at one end to said piston means for reciprocating said piston means in said pressure cylinder tube; a base valve assembly at an end of said pressure cylinder tube; a variable volume compression chamber within said pressure cylinder tube and defined between said reciprocal piston means and said base valve assembly; said base valve assembly including a cylindrical base member; two diametrically opposed inlet ports axially through said base member for the passage of hydraulic fluid from said reservoir chamber to said compression chamber; two diametrically opposed bores axially through said base member; cylindrical valve cages pressed into said bores having valves therein responsive to fluid pressure in said compression chamber for regulating the passage of fluid from said compression chamber to said reservoir chamber; an elongated inlet reed valve extending between said valve cages and having end portions overlying said inlet ports to block passage of hydraulic fluid from said compression chamber to said reservoir chamber; an elongated inlet leaf spring extending between said valve cages in spaced parallelism with said reed valve and having bent end portions contacting said end portions of said reed valve for normally maintaining said inlet ports closed; edge portions on said valve cages overlying the midportion of said inlet leaf spring for holding the ends of said leaf spring against said inlet reed valve.